Oct. 27, 1964  R. E. LORENTZ, JR  3,154,666
METHOD OF BUTT WELDING A PLURALITY OF PARALLEL TUBES
Filed Jan. 2, 1964

United States Patent Office 3,154,666
Patented Oct. 27, 1964

3,154,666
METHOD OF BUTT WELDING A PLURALITY OF PARALLEL TUBES
Roy E. Lorentz, Jr., Chattanooga, Tenn., assignor to Combustion Engineering, Inc., Windsor, Conn., a corporation of Delaware
Filed Jan. 2, 1964, Ser. No. 334,997
6 Claims. (Cl. 219—137)

This invention relates to welding and in particular to a method for butt welding a plurality of parallel tubes.

In various industrial equipment, and particularly in boilers, it is required that tubes be butt welded in the field. This is due to the difficulties of shipping and fabricating the long lengths of tube which are required in boilers over a hundred feet high. For this reason there are a multiplicity of occasions in each boiler such as in furnace walls and superheaters where a plurality of parallel tubes must be butt welded. The expense of making all these welds in the field is considerable, and there is ever a search to find ways of decreasing the field costs.

At present each plurality of parallel tubes to be welded is arranged in one of two methods. The tubes may be installed one at a time, in which case the weld is made circumferentially around the entire tube by one or two welders working their way around; or the tubes are installed in paneled sections with a welder on one side welding circumferentially 180° with a welder on the other side following a similar pattern.

The welding process now used comprises butting tubes with the ends beveled for welding. An arc is struck between a Tungsten electrode and the work in the presence or an inert atmosphere maintained locally in the area of the weld. This arc is used to bring the work to a melting temperature while a separate bare rod filler metal is inserted to the proper location and also melted by the arc. The welder, by proper manipulation of the arc and the filler metal, control, the contour of the first pass in the butt weld groove so that it presents a smooth contour at the internal surface of the tube. With this process, the amperage flowing across the arc can be regulated to a high or low value so as to suit the welder's manipulation of the arc and the filler rod. Generally the amperage is kept on the low side so as to give the welder time for proper manipulation, since the arc is controlled by manipulation with one hand and the filler metal is controlled by manipulation with the other hand.

After this first inert arc pass one or more passes or layers of metal are deposited with the metal arc process which consists of the use of a coated electrode. This requires the use of a different electrode holder and a welding machine of different current characteristics. This welding uses coated rods of definite length which when melted to limits of usability leave a stub length which is unusable and is scrapped.

An improved high speed method of welding is available which utilizes a bare rod coil continuous feed electrode whereby an arc is struck between it and the work in the presence of an atmosphere of carbon dioxide or any other suitable protective or controlling atmosphere. With this process the melting of the electrode itself deposits the filler metal. The filler metal is deposited at an inexorable rate dependent on the amperage setting of the welding machine. The rate of deposition is relatively large, and it cannot be decreased to as small a rate as that obtainable with either of the processes mentioned above.

This process allows the welder to control the weld metal contour at the internal surface of the tubing and to obtain a good contour with a fairly wide variation in root gap. The speed of metal deposition is very high resulting in welding speeds in the order of 50 inches per minute. At this rate a welder is able to change direction as required around 180° of the tube by wrist action, but it is physically impossible for him to proceed around the entire 360°. Furthermore, when the filler metal is deposited at this inexorable rate around a relatively small tube, the tube will heat up at an inexorable rate and may become too hot to allow control of the deposit.

In the present practice where parallel tubes to be welded are joined in the form of the so-called web wall construction, and continuous fins are welded between adjacent tubes, this web is left off or cut back for several inches from the weld location to permit adjustment of tubes ends and access to the tube junction. With this type wall construction the web must then be added, after the butt weld is made, for the length of section representing the fin which was left off or cut back on each side of the weld.

Where work may be done in the shop at the point of initial fabrication, rather than in the field at the point of erection, considerable cost saving may be realized. This is true for many reasons including the improved working conditions which are established in the shop and the ability to move the work around where mass production type machinery and methods can be used. It is, therefore, often possible to show considerable savings where additional shop work can reduce the labor cost in the field.

In the instant invention parallel tubes are joined by fins welded to the tubes at the joint where the butt weld is to be made, thus permitting a continuous weld to be made across the panel of the tubes which will permit the use of the bare rod continuous feed electrode process, rather than requiring tube-by-tube welding.

It is an object of this invention to provide an improved method of butt welding a plurality of parallel tubes.

It is a further object to reduce the time and cost in the field welding whereby parallel tubes are joined in abutting relationship.

It is a further object to provide an improved method of butt welding panels of welded tubes whereby the fins joining the adjacent tubes may be extended to the end of the tubes prior to the butt welding process which permits the use of high speed welding.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawing wherein.

Figure 1:
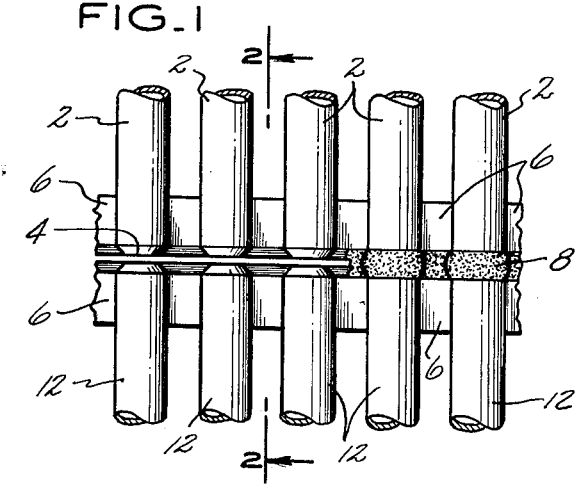
FIGURE 1 illustrates a plurality of tubes with the left section formed in preparation for welding, and the right side showing the completed weld.
Figure 2:
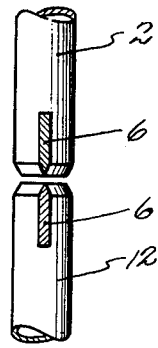
FIGURE 2 shows a section taken through 2—2 of FIGURE 1 illustrating the joint before welding.

Referring to FIGURE 1 a plurality of tubes 2 are maintained parallel with the tube ends 4 being co-planar. Fins 6 are interposed between the tubes with one end of the fin being co-planar with the tube's ends, and the fins are then welded to the adjacent tubes. The tube ends and the end of the fin to be welded to a corresponding panel are beveled by grinding or any other such process as better illustrated by referring to FIGURE 2.

A corresponding panel of tubes is formed from a second plurality of tubes 12 which are similarly formed and butted against the first group of tubes maintaining a space between the tube ends 4 in the order of 1/16 of an inch. A spacing greater than or less than 1/16 of an inch may be used depending on the welding technique employed. Welding is then initiated at one of the outermost ends of the panel proceeding across the fins and around 180° of a tube surface, proceeding across the next fin and tube, and so on to the opposite end of the panel the welded joint thus being formed as shown at welded joint 8. By a similar welding process the opposite side of the panel is welded to form the completed welded joint.

Thus the metal bridge formed by the fins permits a continuous weld to be made moving directly across the panel, whereby the more desirable and less expensive high speed welding processes can be used. This improved welding process which may now be used obviates the necessity of start and stop welding for the changing of rods and also obviates the necessity of changing welding machines between the root pass and the filler passes. Furthermore, the additional mass added by the fins provides an increased heat sink to aid in carrying away the inexorable heat generated in this high speed welding process.

In the normal situation where these parallel tubes need not have provisions for relative longitudinal movement these fins can be left in place. If, however, the design requires relative movement between the tubes, these fins may be cut longitudinally after the welded joint is completed.

Figure 3:
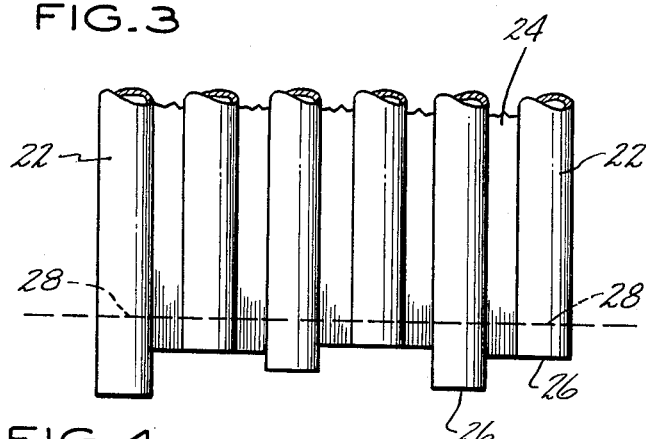
FIGURE 3 illustrates a welded panel as formed where there are irregular tube lengths with the fin extended to the end of the tubes.

In FIGURE 3 a plurality of parallel tubes 22 are joined by continuous fins 24. A panel of this type is inexpensively formed by the use of automatic welding machines designed for this purpose. In the past care was taken to stop the fin material several inches from the end of the tube to permit butt welding of the adjacent panels in the field. In this process, however, the fin is extended the entire length of the tube. Due to required fabricating tolerances the fabricated panel will often have tube ends which do not lie in a common plane as illustrated by tube ends 26. A panel thus formed would then be cut to the desired length through cutline 28—28. The plurality of parallel tubes is now formed with a bridge between tubes forming a continuous metal path from one end of the panel to the other. Because of possible inability to fabricate to exact centerline to centerline distances between tubes, it may be necessary to split this continuous web at selected webs to allow adjustment of tube ends for proper alignment for butt welding. A narrow split in the order of 1/16 of an inch width will allow such adjustment and will not interfere unduly with the welding procedure being described.

Figure 4:
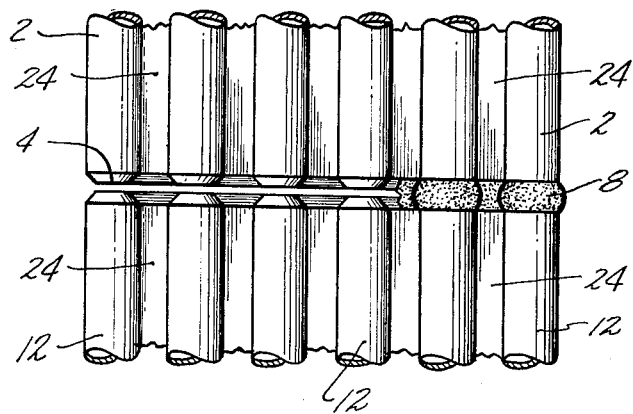
FIGURE 4 shows a welded panel with the fins extended to the welding joint with the left side shown as prepared for welding, and the right side shown where the weld has been completed.

FIGURE 4 illustrates the panel of FIGURE 3 including tubes 22 being butt welded to a second panel comprised of a plurality of parallel tubes 32. Tube ends 4 are prepared by beveling as in the earlier illustration and the welded joint is completed by welding along each side of the panel. In the application of this invention to welded panel design, the fin being added to effect the metal bridge, merges and becomes a part of the panel web. There is no requirement for relative longitudinal movement and therefore no need to cut these fins after welding.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:
1. An improved method of butt welding a plurality of parallel tubes comprising: maintaining a first group of tubes in laterally spaced parallel relation, with the ends of the tubes to be welded being co-planar; interposing between these tubes at least adjacent said ends metal members welded to the adjacent tubes, with these members providing a metal bridge between tubes so as to form a continuous metal path in the plane of said tube ends from one outermost tube to the other, beveling the end of the tubes to be welded and the co-planar edges of the member; similarly forming a second and corresponding tube group; butting the first group of tubes against the second group, with corresponding tubes being coaxial and the continuous metal path being in generally abutting relation; joining these groups by welding by applying a localized welding heat to the juncture formed by said abutting relation, and continuously moving the welding heat therealong on each side of the juncture.

2. An improved method of butt welding a plurality of parallel tubes comprising: maintaining a first group of tubes in laterally spaced parallel relation, with the ends of the tubes to be welded being co-planar; interposing between these tubes at least adjacent said ends metal members secured to the adjacent tubes, with these members providing a metal bridge between tubes so as to form a continuous metal path in the plane of the tube ends from one outermost tube to the other, similarly forming a second and corresponding tube group; positioning the ends of these two groups provided with this continuous metal path in generally abutting relation with corresponding tubes being generally coaxial; joining these groups by welding by applying a localized welding heat to the juncture formed by said generally abutting relation, and continuously moving the welding heat therealong on each side of the juncture.

3. A method of butt welding a plurality of parallel tubes comprising: arranging a first group of parallel tubes so that the ends to be welded are co-planar; joining the tubes so arranged by welding fins adjacent the ends to be welded, one edge of the fin being co-planar with the tube ends; beveling the end of the tube and the fin to be welded; similarly forming a second group of tubes; butting the first and second groups of tubes so that each tube is generally coaxial with its corresponding tube in the other group; joining the groups of tubes by welding across each side of the junction formed by said abutting relation.

4. A method as in claim 3 including the step of subsequently cutting the fins between the parallel tubes longitudinally so that the tubes are free to move with respect to one another.

5. A method of butt welding a plurality of parallel tubes comprising: forming a first group of tubes into a panel with the tubes being parallel and with fins being interposed and welded to adjacent tubes throughout a major portion of the panel and including that portion adjacent the tube ends to be joined, thus forming a continuous metal path across the end of the panel from the outermost tube at one side of the panel to the outermost tube at the other side of the panel; beveling the end of the tubes to be welded and the fins; similarly forming another tube panel; positioning these panels in abutting relation so that the corresponding tubes of each panel are generally coaxial; and applying an electric arc by means of a continuous feed consumable electrode to the juncture of these panels thus formed and moving this arc along the juncture from one end of the panel to the other on each side of the panel.

6. A method of butt welding a plurality of parallel tubes comprising: forming a first group of parallel tubes into a welded panel having the tubes joined by welded fins for a substantial portion of their length, the fins co-acting with the tubes to form a continuous metal path from one side of the panel to the other; similarly forming a second group of tubes into a second welded panel; cutting in a straight line across the first panel in such a location that said continuous path is obtained at the cut; cutting the second panel in a similar manner such that the first and second panels may be placed in abutting relation with corresponding tubes being coaxial; beveling the ends of the tubes and fins of each panel in preparation for welding; placing the panels in abutting relation with corresponding tubes being generally coaxial; joining the panels by welding across the junction thus formed by continuously welding across each side of the panel from one end of the panel to the other.

References Cited in the file of this patent

UNITED STATES PATENTS

| | | |
|---|---|---|
| 2,441,748 | Black | May 18, 1948 |
| 2,747,065 | Diehl | May 22, 1956 |
| 2,862,101 | Klinke | Nov. 25, 1958 |

UNITED STATES PATENT OFFICE
CERTIFICATE OF CORRECTION

Patent No. 3,154,666                           October 27, 1964

Roy E. Lorentz, Jr.

It is hereby certified that error appears in the above numbered patent requiring correction and that the said Letters Patent should read as corrected below.

Column 1, line 38, for "control," read -- controls --; column 4, line 11, for "edges" read -- edge --.

Signed and sealed this 6th day of April 1965.

(SEAL)
Attest:

ERNEST W. SWIDER                        EDWARD J. BRENNER
Attesting Officer                          Commissioner of Patents